United States Patent [19]

Osman

[11] 4,409,191
[45] Oct. 11, 1983

[54] INTEGRATED CYCLIC SCRUBBING AND CONDENSATE STRIPPING PROCESS FOR THE REMOVAL OF GASEOUS IMPURITIES FROM GASEOUS MIXTURES

[75] Inventor: Robert M. Osman, Parsippany, N.J.
[73] Assignee: Exxon Research & Engineering Co., Florham Park, N.J.
[21] Appl. No.: 336,638
[22] Filed: Jan. 4, 1982
[51] Int. Cl.³ .............................. B01D 53/34
[52] U.S. Cl. ................... 423/220; 423/223; 423/228; 423/229; 423/232
[58] Field of Search ............ 423/210, 220, 223, 228, 423/229, 232, 233

[56] References Cited
U.S. PATENT DOCUMENTS

| | | | |
|---|---|---|---|
| 3,787,559 | 1/1974 | Rudolph et al. | 423/223 |
| 3,823,222 | 7/1974 | Benson | 423/232 X |
| 4,160,810 | 7/1979 | Benson | 423/223 X |
| 4,198,378 | 4/1980 | Giammarco et al. | 423/220 |
| 4,308,243 | 12/1981 | Castel et al. | 423/220 |

Primary Examiner—Earl C. Thomas
Attorney, Agent, or Firm—Robert A. Maggio; Jack B. Murray, Jr.

[57] ABSTRACT

A process for removing acid gases such as $CO_2$ and $H_2S$ from gas streams using a cyclic aqueous alkaline scrubbing solution which is circulated between an absorption and regeneration stage is disclosed. This process is improved by integrating within this cyclic system a process scheme wherein condensed steam having gaseous impurities dissolved therein is recovered from the feed gas and subjected to a pressure below which scrubbing solution regeneration takes place. While maintaining this pressure, the process condensate is heated, boiled and stripped to evolve a vaporous mixture comprising steam and gaseous impurities which are compressed and introduced into the regeneration stage. By this process, useful work is performed by low temperature process streams thereby improving the overall efficiency of the cyclic process.

7 Claims, 2 Drawing Figures

Fig.1

INTEGRATED CYCLIC SCRUBBING AND CONDENSATE STRIPPING PROCESS FOR THE REMOVAL OF GASEOUS IMPURITIES FROM GASEOUS MIXTURES

BACKGROUND OF THE INVENTION

The present invention relates to an improvement in processes for removing acid gases, such as $CO_2$ and $H_2S$, from hot steam containing gas mixtures.

The industrial importance of gas scrubbing processes involving the bulk removal of acid gases, particularly $CO_2$ and $H_2S$, from various raw gas mixtures is steadily increasing. As the demand for synthetic fuels and synthesis gases derived from fuel sources such as natural gas, oil and coal increases, there is an ever-increasing need for efficient processes for the removal of $CO_2$ and/or $H_2S$ from the raw gas mixtures that are generated. For example, in the reforming of natural gas to produce hydrogen for ammonia synthesis or hydrogenation reactions, a raw gas is produced containing usually from 16% to 20 dry mole % $CO_2$, all of which must be removed prior to the ammonia synthesis step. Likewise, in the production of synthetic methane from naphtha, fuel oil or coal, the starting material is subjected to reforming or partial oxidation, producing a raw gas containing, e.g., from 20% to as much as 50% of $CO_2$, together with smaller amounts of $H_2S$ where a sulfur-containing starting material is employed.

The acid gas containing mixtures produced by such processes as steam-reforming and partial oxidation are at elevated temperatures (and usually at elevated pressures) and contain large amounts of steam. Good thermal efficiency demands the efficient recovery and utilization of the heat content of such raw gases. In this connection, the extent to which such heat content can be efficiently utilized to provide the energy required to remove the large quantities of acid gases they contain is a highly significant factor in determining the overall energy efficiency of the system.

In modern practice, the most widely used process for the bulk removal of $CO_2$ and $H_2S$ from such gas mixtures involves scrubbing of the gas with aqueous alkaline scrubbing solution. The scrubbing solution is continuously recirculated between an absorption stage where the acid gases are absorbed, and a regeneration stage in which the acid gases are desorbed from the solution by means of steam-stripping. For most applications, efficient types of such cyclic processes utilize a substantially isothermal absorption and regeneration cycle, i.e. the absorption and regeneration stages are operated at or close to the same temperature, e.g. a temperature in the vicinity of the atmospheric boiling temperature of the scrubbing solution. By eliminating the heating and cooling that is required by non-isothermal processes, heat losses are greatly reduced.

In any such process, whether isothermal or non-isothermal, the major energy requirement in the process is the stripping steam for regenerating the solution, and it is accordingly highly desirable to reduce the regeneration heat requirements and/or derive such regeneration heat from heat sources that may have little or no utility for other purposes.

Conventional sources of at least part of the regeneration heat employed in the prior art include that present in raw feed gas. It has been particularly desirable in the past to recover as much low-level heat content of the raw process gas as possible for regeneration, so that the higher energy level heat in the process gas can be utilized for other purposes.

For example, U.S. Pat. No. 3,823,222 (referred to herein as Benson I) discloses that the hot, steam-containing feed gas is passed in series through two heat exchangers, the first of which boils water to produce medium-pressure steam to operate a steam ejector, and the second of which raises relatively low-pressure steam in a heat exchanger where scrubbing solution is heated. The steam ejector is employed to raise additional low-pressure steam by subjecting regenerated scrubbing solution to a reduced pressure, and then to compress such low-pressure steam and inject it into the regenerator as additional stripping steam. However, the process gases, in passing through the two heat exchangers to recover the waste heat available therein, are cooled sufficiently to condense most, or at least a part of the steam present in the same. This condensed steam, referred to herein as unstripped process condensate, typically contains dissolved $CO_2$ and other impurities such as alcohols, ammonia, and/or amines (the latter two being normally present in raw ammonia plant syn gas which has a substantial nitrogen content). In Benson I, the unstripped process condensate and impurities are not recovered before the process feed gases are fed to the absorber. Consequently, substantial amounts of water will accumulate in the cyclic system, either drastically diluting the scrubbing solution or requiring large amounts of external heat input to vaporize the excess water just to maintain the water balance in the system.

U.S. Pat. No. 4,160,810 (hereinafter referred to as Benson II) discloses in FIG. 1 the use of two heat recovery steps to make stripping steam for regeneration of the alkaline scrubbing solution.

In accordance with FIG. 1 of Benson II, the first heat recovery step involves an indirect heat exchange between the hot feed gas and the scrubbing solution, thereby heating the scrubbing solution to its boiling point and producing steam that is utilized in the regeneration stage as stripping steam. The partially cooled hot gas is then conducted to a second heat exchanger where the gas is passed in heat-exchange relationship with water (which is preferably water condensate produced in the scrubbing process). This second heat-exchange step may be carried out by direct or indirect contact of the gas with the water. In the course of this second heat-exchange step, the water is subjected a reduced pressure, thus lowering its boiling temperature, and the water of reduced boiling temperature is at the same time brought into heat-exchange relationship with the hot feed gas. The steam produced by heating of the water under reduced pressure is generated at a lower pressure than the pressure in the regeneration stage, and this low-pressure steam is compressed to a level at least equal to that in the regeneration stage and injected into the regenerator as stripping steam. However, the unstripped hot process condensate is removed from knockout pot 43A of FIG. 1 in one embodiment (the subsequent use thereof being unspecified), or in another embodiment, it may be introduced into a separate flash tank with a suitable pressure letdown valve between the knockout pot and the flash tank. The flash tank receiving the unstripped process condensate is connected to the suction side of a compressor causing low pressure steam to flash off from the condensate. This steam is then compressed and fed into the bottom of the regenerator (see col. 17 lines 4 et seq). Thus, in the first embodiment the unstripped process condensate containing impurities presumably could be discharged into the environment potentially creating ecological problems. In the second embodiment, while the low level heat content of the unstripped condensate has been recovered, most of the impurities still remain therein since mere flashing is not sufficient to purify the process condensate. Thus, in Benson II one is still faced with the problem of what to do with the substantially unstripped process condensate. Discharging it to the environment creates ecological problems. The use of unstripped process condensate as boiler feed water is limited by the corrosion problems caused by the impurities present therein at high temperatures and pressures. Thus, the use of unstripped process condensate as boiler feed water in high pressure, high temperature boilers is disadvantageous, and from an economic standpoint precluded.

In view of the above, Benson II provides no suggestion of how to approach the problem of disposal of the unstripped process condensate.

In conventional practice, the process condensate is stripped by direct or indirect (using a reboiler) heat exchange with steam or some other fluid. Typically the overhead vapors are vented or condensed against cooling water. This represents a significant energy consumption since the heat in the overhead stripper vapors are wasted.

To help reduce wasted energy consumption, alternative schemes have been developed. Thus, it is known to feed the process condensate stripper overhead vapors to the regeneration stage to permit the heat contained therein to assist in regenerating the scrubbing solution used to remove $CO_2$, $H_2S$ and the like from the process feed gas. These vapors are added to the regeneration stage as supplemental stripping steam. This conserves some of the energy in the process condensate stripper overhead vapors. However, in order to enter the scrubbing solution regenerator, the process condensate stripper overhead must be at a pressure level above atmospheric (particularly if the scrubbing solution regenerator overhead $CO_2$ is to be processed for sale or to make urea). The elevated pressure necessary in the process condensate stripper in turn significantly raises the process condensate stripper bottoms temperature. A higher bottoms temperature in the stripper requires an associated higher heating fluid temperature for stripping the process condensate, since the temperature differential between the heating fluid and that of the stripper bottoms must be great enough to provide the driving force for the heat exchange. This requirement prevents the use of very low level waste heat (which has little or no value for other applications) for stripping the process condensate.

U.S. Pat. No. 4,198,378 discloses several embodiments for the purification of boiler feed waters. In some of these embodiments, the boiler feed waters include the process condensate. However, in none of these embodiments is low level heat used to strip process condensate under a pressure below that present in the regeneration stage, with the condensate stripper overhead vapors being fed to the regeneration stage. For example, in FIG. 2 process condensate can be fed to Column H from separator S for partial purification with air, or other gases, and then passed to Column D via line 26 where it is stripped (degassed) with steam. In all instances, Column D is maintained at a pressure at least equal to that of the regeneration Column B (e.g. col. 4 lines 60 et seq) or at a pressure higher than that of regeneration Column B (e.g. col. 6 lines 60 et seq). Heat supplied to Column D can be derived from high or medium temperature steam or by hot process gas preferably delivered at the maximum temperature corresponding to the outlet temperature from the CO conversion apparatus. Each of these heat sources for Column D reflects the high temperature which must be possessed thereby to obtain the necessary thermal driving force for efficient heat transfer due to the pressures and temperatures present in Column D. Likewise, in accordance with FIG. 3 of the aforenoted patent, it is known that one can modify the scheme of FIG. 3 by feeding the process condensate (which is sewered in FIG. 3) to Column D where it is stripped and flashed to provide part of the motive steam used in a steam ejector which is fed to the regeneration column as stripping steam. However, the still higher pressures necessary to generate motive steam for the ejector would increase even further the temperature requirements of the heat source to Column D (col. 7 lines 3 et seq.)

For further background on $CO_2$ removal systems, see U.S. Pat. Nos. 3,101,996; 3,288,557; 3,714,327; 3,962,404; 4,073,863; and the two papers presented at the American Institute of Chemical Engineers, 72nd Annual Meeting, Nov. 25–29, (1979) by Crabs et al entitled "Energy Savings for Carbon Dioxide Removal Systems", and by Stokes, J., entitled "The Economics of $CO_2$ Removal in Ammonia Plants"; none of which disclose the present invention.

In contrast, the present invention maintains the pressure of the process condensate stripper at a relatively low level thereby reducing the temperatures in the stripper bottoms. This reduction in the stripper bottoms temperature permits the use of a very low level heat source for stripping. The stripper overhead vapors are then compressed and fed at the resulting elevated pressure to the regeneration stage where the compressed vapors serve as supplemental stripping steam for regeneration of the scrubbing solution. The present invention therefore renders it possible to recover additional low level heat (which would otherwise typically be wasted), use it to purify the process condensate, and at the same time, use the resulting process condensate stripper overhead steam for regeneration. While the means for compressing the steam uses some energy, it is much less than the energy it saves. The purification of the process condensate permits it to be economically employed as boiler feed water in high temperature, high pressure boilers, or to be discharged to the environment with less adverse ecological impact than unstripped process condensate.

SUMMARY OF THE INVENTION

In one aspect of the present invention there is provided an improvement in a cyclic process for the removal of acid gases from a feed gas stream comprising a hot, steam-containing gas mixture by means an aqueous alkaline scrubbing solution which is ciontinuously recycled between an absorber in which said gases are absorbed by the scrubbing solution and a regenerator stage in which said acid gases are desorbed by steam stripping. Prior to entering the absorber of the cyclic process scheme, the hot steam containing gas mixture has at least a portion of the steam content therein condensed and separated from the gas mixture to form a process condensate having gaseous impurities dissolved therein. The improvement in this process comprises: (a)

subjecting said process condensate to a pressure lower than the pressure at which scrubbing solution regeneration takes place; (b) subsequently heating the process condensate resulting from, and at the pressure of, step (a) with at least one fluid having a temperature sufficient to boil and strip said process condensate of at least a portion of the gaseous impurities dissolved therein, and to yield a vaporous mixture comprising steam and said stripped gaseous impurities; (c) separating said vaporous mixture of step (b) from the stripped process condensate and compressing the vaporous mixture to a pressure at least equal to the pressure at which scrubbing solution regeneration takes place; and (d) introducing said compressed vaporous mixture into the regenerator to assist in said steam stripping.

In another aspect of the present invention, the feed gas is also cooled prior to entering the absorber to condense steam, thereby forming the process condensate which is then treated in accordance with the process described in the above embodiment. However, in this embodiment at least a portion of the heat content removed from the feed gas during this cooling is used to boil scrubbing solution to produce steam utilized as stripping steam for regenerating the scrubbing solution. This is achieved by passing the hot feed gas, prior to using the feed gas to heat the process condensate, when such feed gas constitutes the fluid described in step (b) above, in indirect heat exchange relationship with the scrubbing solution thereby heating the scrubbing solution to its boiling point and producing steam. The resulting steam is then introduced into the regenerator where it serves as stripping steam. The resulting partially cooled feed gas is then eventually used to heat and boil the process condensate by recovering the low heat content remaining therein.

BRIEF DESCRIPTION OF THE DRAWINGS

The diagrammatic showing of FIGS. 1 and 2 omit in certain instances features which those skilled in the art would recognize as desirable in actual plant operation. These omissions are made in order to simplify the presentation of the invention and to avoid encumbering it with well understood engineering details. Thus, for example, certain equipment obviously needed for flow control, safety equipment, start-up schemes, etc., are omitted from the diagrammatic representation.

DESCRIPTION OF PREFERRED EMBODIMENTS

Described in its broader aspects, the invention employs a cyclic scrubbing process utilizing an aqueous alkaline scrubbing solution which is continuously recycled between an absorber, where the acid gases contained in the hot, steam-containing feed gas are absorbed, and a regenerator, in which the absorbed acid gases are desorbed by steam-stripping.

Integrated within this cyclic scrubbing process is the process condensate stripper and means for compressing the overhead vapors resulting therefrom.

More specifically, a hot, steam containing gas mixture to be treated for the removal of its acid gas content (referred to herein collectively as the feed gas) is cooled to temperatures sufficient to condense at least a portion of the water present therein to form a process condensate comprising water and gaseous impurities dissolved therein. The particular temperature to which the feed gas is cooled is not critical and will typically depend on the extent to which one can successfully utilize the heat derived therefrom in the overall system. However, the lower the temperature to which the feed gas can be cooled, the more steam that will condense, the greater the amount of gaseous impurities that will dissolve therein, and the lower will be the temperature of the process condensate. The lower the pressure of the process condensate stripper, the lower the temperature of the heat source for the process condensate stripper can be at a given pressure, and still provide the thermal driving force for condensate stripping.

Accordingly, while the temperature of the feed gas can be cooled to any temperature effective to condense steam present therein, it is preferred that such effective temperatures constitute from about 150° to about 270° F., preferably from about 215° to about 260° F., and most preferably from about 225° to about 245° F.

The means used to achieve such cooling is also not critical. Typically such means are sufficient to permit heat exchange between the hot feed gas and a cooler fluid (liquid or gas) in a direct or indirect fashion, and recovery of the process condensate. Such means include one or more indirect heat exchangers such as a reboiler, boiler feed water preheater, or one or more direct contact heat exchangers. Typically such heat exchange means and the heat transferred thereby can be used to heat regenerated scrubbing solution, and/or water in accordance with U.S. Pat. Nos. 3,823,222 and 4,160,810, the disclosures of which are herein incorporated by reference, and the heat recovered thereby used to assist in regenerating the scrubbing solution or for some other purpose. Preferably, the feed gas after a substantial portion of the high level heat content has been recovered for other purposes, is used as the low level heat source for stripping the process condensate as described herein.

The pressure of the feed gas is conventionally high enough, and the temperature to which it is cooled low enough, to cause condensation of a major portion of the steam at the selected pressure, and dissolution of gaseous impurities in said condensed steam. Pressures possessed by the feed gas before it is cooled will depend on the particular overall process system employed and site economic factors. Typically, such pressures can range from about 100 to about 1000 psig. For reforming type ammonia plants, such pressures typically range from about 250 to about 500 psig. Similar considerations apply with respect to the temperature of the feed gas before it is cooled. Such temperatures typically range from about 350° to about 600° F. For ammonia reforming plants such temperatures typically range from about 400° to 550° F. In ammonia synthesis, the feed gas is typically obtained from the low temperature shift reactor.

In addition to $CO_2$ and/or $H_2S$, other gaseous impurities well known to be present in the feed gas include $NH_3$, methanol, amines, COS and the like.

The process condensate is then separated, i.e. removed, from the uncondensed portion of the feed gas. This is achieved by conventional techniques such as one or more knock-out pots, which allow for collection of the process condensate from the bottom thereof, and the uncondensed feed gas as overhead vapors which typically are fed to the absorption column.

The process condensate is then passed to a means, referred to herein as the condensate stripper, within which a portion of the impurities present therein can be removed and low pressure steam generated. Since the pressure of the process condensate is typically greater than the pressure in the condensate stripper, a pressure letdown valve is employed to control the flow of process condensate to the latter.

The temperature of the process condensate introduced into the condensate stripper preferably should be low enough to avoid producing large amounts of steam as the process condensate passes through the pressure letdown valve. Flashing at this point is an inefficient use of the heat in the process condensate, because it does not do any stripping, and subsequently must be compressed consuming additional energy. Flashing of the process condensate before or as it enters the condensate stripper is therefore preferably substantially avoided or at least minimized. This can be achieved by cooling, by additional heat exchangers where necessary, the process condensate in conjunction with the pressures possessed by the same to avoid or limit flashing as it enters the condensate stripper. In most instances such cooling will be unnecessary where all of the process condensate is not separated from the feed gas until just prior to the time when the feed gas enters the absorption stage. In this instance the process condensate will be cooled along with the uncondensed feed gas as they both pass through the various heat exchangers described herein. However, where the process condensate is separated from the feed gas after passing through each successive heat exchanger, the combined temperature of the various process condensate streams which are fed to the condensate stripper may be substantially above their combined flash point at the process condensate stripper pressure. Consequently, it is a preferred arrangement if this hot process condensate can be preferably further cooled, by usefully transferring heat to another fluid which must be heated, to a temperature closer to its flash point before entering the condensate stripper.

The pressure in the condensate stripper is maintained below the pressure at which scrubbing solution regeneration takes place. In those instances where regeneration occurs simultaneously at more than one pressure, the "pressure at which scrubbing solution regeneration takes place" (also referred to herein as the "regeneration pressure" for convenience) is herein defined to be the pressure existing at the point, in the regenerator, where the stripped process condensate overhead vapor enters the same.

While any pressure in the process condensate stripper below the regeneration pressure will suffice for the present invention, greater efficiencies in terms of heat recovery from the heat source for the condensate stripper are obtained when the pressure of the condensate stripper is substantially below the regeneration pressure. Thus, the pressure of the condensate stripper typically will be from about 1 to about 25 psi, preferably from about 5 to about 20 psi, and most preferably from about 5 to about 15 psi below the regeneration pressure.

By adjusting and reducing the pressure in the process condensate stripper within the aforedescribed ranges, the temperature of the process condensate at the bottom of the stripper can likewise be reduced to the extent necessary to achieve a suitable temperature differential between process condensate bottoms and the heat source (described hereinafter) used to boil and strip said bottoms. The lower the pressure in the condensate stripper, the lower the temperature of the bottoms process condensate, and hence the lower the minimum heat level (i.e., temperature) of the heat source necessary to achieve such temperature differential.

Accordingly, pressures in the process condensate stripper, when integrated with preferred conventional absorption-regeneration systems operating at conventional pressures as described herein can generally range from about −10 to about 25 psig, preferably from about 0 to about 10 psig, and most preferably from about 0 to about 6 psig, and yield temperatures of the process condensate bottoms in the range of from about 150° to about 270° F., preferably from about 210° to about 240° F., and most preferably from about 210° to about 230° F.

The particular pressure-temperature balance in the process condensate stripper is conveniently selected to achieve a temperature differential between condensate bottoms and the exit temperature of the heat source driving the stripper sufficient to strip and boil the process condensate. Such process condensate temperatures and temperature differentials are readily achieved in the practice of the present invention, and permit efficient recovery and transfer of a substantial portion of the low level heat content of said heat source which would otherwise be unuseable for stripping the process condensate in accordance with prior art techniques.

The process condensate is stripped of its impurities and a portion of the water present therein vaporized to steam by subsequently heating it in a heat exchanger at the aforedescribed reduced pressures with a fluid (liquid or gas) having a low level heat content which can be recovered and transferred to the process condensate. The low level heat content of the fluid is expressed in terms of the temperature of the same. As described above, the temperature of the heating fluid is controlled in conjunction with the pressure (and temperature) in the process condensate stripper to provide the temperature differential required to generate thermal driving force for the heat transfer to the latter. Because the temperature of the process condensate bottoms is reduced by the reduction of the pressure in the condensate stripper, the aforedescribed temperature differentials correspondingly reduce the temperature requirements of the heating fluid. While it is possible to use a fluid having a greater temperature than is necessary to boil and strip the process condensate, use of such a high temperature fluid for this purpose would be wasteful of energy and the higher level heat content possessed by the same can better be used elsewhere in the system.

Accordingly, the temperature of the heating fluid in contact with the process condensate as it exits the heat exchanger typically is not greater than about 50° F., preferably not greater than about 40° F., and most preferably not greater than about 30° F. above the boiling point of the process condensate at the aforedescribed pressures. Similarly, when steam is injected directly into the stripper, its condensation temperature at its supply pressure is typically not greater than about 50° F., preferably not greater than about 40° F., and most preferably not greater than about 30° F. above the boiling point of the process condensate. Within the context of the temperature-pressure balance existing in the process condensate stripper and the temperature differentials necessary to achieve heat transfer as described above, the exit temperature of the heating fluid employed in indirect heat exchange relationship with the process condensate and after transfer of heat to the process condensate typically will vary from about 150° to about 300° F., preferably from about 200° to about 270° F., and most preferably from about 220° to about 250° F.

The heating fluid can be any liquid or gas capable of transferring its heat to the process condensate without adversely influencing the events taking place within the process condensate stripper or the cyclic absorption-regeneration system. Typical heating fluids include steam, and any process streams available at a suitable temperatures as would be obvious to one skilled in the art.

The preferred heating fluid is the feed gas to be purified. Thus, in accordance with conventional practice, hot feed gases from the reforming furnace, partial oxidation unit, or water-gas shift reactor are passed through one or more heat recovery stages where the heat content of these gases is e.g., recovered and employed to generate steam in waste heat boilers, or to preheat air or boiler feed water. In the preferred embodiment, after maximizing higher level heat recovery, these hot feed gases are brought into indirect heat exchange relationship with scrubbing solution, preferably withdrawn from the regenerator, thereby boiling the scrubbing solution and producing steam therefrom. This scrubbing solution derived steam is then introduced into the regenerator where it serves as regeneration stripping steam.

Upon cooling of the hot feed gases to the aforedescribed temperatures of the heating fluid, they are placed in heat exchange relationship with the process condensate in the stripper and allowed to transfer additional low level heat content present therein, and optionally passed through one or more additional low level heat content heat exchangers, before being passed to the absorber.

In some cases it may be more convenient to supply, as an alternative or as a supplement, steam or heat derived from sources other than the feed gas which is at the appropriate heat exchange temperature to heat the process condensate.

The means for implementing the heat exchange between the heating fluid and the process condensate are conventional in the art.

Thus, the heating fluid may be employed in direct or indirect heat exchange relationship with the process condensate present in the condensate stripper. Said heating fluid may be supplied to the process condensate via an indirect heat exchanger (e.g. reboiler) located external to the condensate stripper or by one which is situated within the stripper itself. Alternatively, the heating fluid may be injected directly into the condensate stripper.

Preferably, a reboiler is employed located external to the condensate stripper in which indirect heat exchange takes place.

By means of the heating fluid, the process condensate is heated, preferably continuously, to its boiling point at the pressure prevailing in the condensate stripper. In this manner, through the natural boiling action of the process condensate, it is stripped of a portion, preferably a major portion, of its gaseous impurities along with a portion of its water content which is vaporized as steam. The size of the condensate stripper reboiler is conventionally controlled in conjunction with the temperature of the heating fluid and the pressure in the process condensate stripper to evolve from about 0.05 to about 0.5, preferably from about 0.1 to about 0.35, and most preferably from about 0.15 to about 0.30 lbs steam/lb condensate.

It is to be noted that the upper levels of steam evolution recited in the above ranges do not necessarily represent the minimum required to achieve acceptable stripping of the process condensate, but rather reflect a desire to maximize low level heat recovery from the feed gas.

By controlling the rate at which steam is evolved from the process condensate and/or introduced as the heating fluid, an equilibrium is established with the evolved and/or added steam. In this manner, a vaporous mixture comprising steam and gaseous impurities is discharged as an overhead vapor stream from the top of the stripper. This low pressure vaporous mixture is then compressed by a suitable means to a pressure sufficient to enable the vaporous mixture to be introduced into the regenerator where it assists in stripping the spent scrubbing solution. In order to enter the regenerator, the vaporous mixture must be compressed to a pressure at least equal to, and preferably slightly greater than, the pressure existing in the regenerator at the point where it is introduced therein (referred to herein as the "point regeneration pressure"), and is preferably compressed to a pressure at least equal to, most preferably slightly greater than the pressure prevailing at the bottom of the regeneration stage into which it is introduced.

Any suitable compression means conventional in the art for compressing steam can be used in the present invention. Thus, in a preferred embodiment the suction side of a mechanical compressor is adapted to receive the overhead vapor stream issuing from the top of the condensate stripper. The compressor therefore not only serves to compress the low-pressure steam and gaseous impurities, but it also provides the means for reducing and controlling the pressure within the condensate stripper.

Alternatively, the suction side of a steam ejector can be adapted in a similar fashion to achieve a similar result. In this embodiment, a source of motive steam must be supplied to the ejector to achieve pressure reduction and compression. The mixture of flash (from the condensate stripper) and motive steam is then injected into the regenerator.

The point(s) at which the compressed steam is introduced into the regenerator which may comprise one or more stages is not critical to the invention. For each regeneration stage into which the compressed vaporous mixture is introduced, it is preferred that the point(s) of introduction be located far enough down the particular regeneration stage to permit the vaporous mixture to flow upward in a countercurrent direction to spent scrubbing solution.

The stripped process condensate present at the bottom of the condensate stripper, if intended for use as make-up water for high pressure boilers, is typically subjected to a demineralization treatment by contact with an ion exchange resin or with chemicals to remove ions which may produce harmful scale and/or corrosion in high pressure boilers, and then deaerated with steam, or inert stripping gas and the like to remove traces of oxygen and/or $CO_2$ which may have been absorbed by the process condensate during demineralization.

As illustrative of the extent of purification which can be achieved by practice of the present invention, unstripped process condensate derived from a conventional ammonia synthesis feed gas typically possesses impurities having the following representative compositions:

| | |
|---|---|
| $CO_2$: | 1000 to 5000 ppm |
| $NH_3$ and amines: | 500 to 2000 ppm |
| $CH_3OH$ and other organic materials: | 300 to 2500 ppm |

The above process condensate after stripping on the other hand can typically exhibit the following composition:

| | |
|---|---|
| $CO_2$: | 5 to 100 ppm |
| $NH_3$ and amines: | 1 to 100 ppm |
| $CH_3OH$ and other organic materials: | 5 to 200 ppm |

The process of the present invention, and the conservation of heat obtained thereby, is particularly advantageous in that not only does it provide a flexible means for recovering a substantial amount of low-level heat (from various process streams already present in conventional absorption-regeneration systems) which in the past has been difficult to recover economically because said heat is at too low a temperature level, but the subject process also utilizes this heat to perform two important and useful functions, namely, stripping of the process condensate and assisting in the stripping of the spent scrubbing solution. Since these functions are performed by low level heat containing process streams, higher energy level heat which may initially be present in these streams is made available for other uses.

As indicated previously, the invention is applicable, and can be integrated, generally with systems using any regenerable absorbent solution, preferably any regenerable aqueous alkaline scrubbing solution including e.g. aqueous solutions of alkali metal carbonates, particularly potassium carbonate, aqueous solutions of ethanolamines, or alkali metal phosphates. Particularly preferred are relatively concentrated potassium carbonate solutions having potassium carbonate concentrations of 15 to 45% and preferably from 20 to 35% by weight (these concentrations being calculated on the assumption that all the potassium present is present as potassium carbonate). Potassium carbonate solutions are preferably activated by the addition of additives such as amines, particularly ethanolamines, alkali metal borates such as potassium borate or sodium borate, $As_2O_3$, amino acids such as glycine or other additives which tend to increase the rates of absorption and desorption of acid gas in the potassium carbonate solution.

In addition to the potassium carbonate solutions, with or without activators, other regenerable aqueous alkaline scrubbing solutions may be employed such as aqueous solutions of the ethanolamines or aqueous solutions of the alkali metal phosphates such as potassium phosphate.

As is well known, the reactions occurring during absorption and regeneration differ depending upon the particular scrubbing solution employed. In the case of potassium carbonate, the absorption of $CO_2$ produces potassium bicarbonate while regeneration or desorption releases $CO_2$ producing potassium carbonate. As is also well known, the reversible absorption and desorption reactions do not go to completion in either the absorption or regeneration stages, and consequently the scrubbing solution, as circulated, is actually a mixture. In the case of potassium carbonate solutions, for example, the regenerated scrubbing solution fed to the absorber in the case of $CO_2$ absorption is a carbonate-bicarbonate mixture rich in carbonate, while the solution leaving the absorber is a mixture rich in bicarbonate. References herein to scrubbing solutions of potassium carbonate, ethanolamines, potassium phosphate are, of course, intended to include mixtures of these compounds with the reaction products formed during the absorption process.

The present invention is obviously also applicable to the use of regenerable absorbent solutions in any single stage of multiple stage absorption and/or regeneration methods known in the art.

The condensate stripper-compression means scheme of the present invention is preferably integrated with conventional cyclic scrubbing processes in which absorption and regeneration are carried out at or close to the same temperatures and in which the absorption occurs under substantial super-atmospheric pressures of at least 100 psig, typically from about 100 to about 1,500 psig, and in which the regeneration occurs at close to atmospheric pressure, e.g. typically from about −5 to about 50 psig, preferably from about 0 to about 30 psig, and most preferably from about 5 to about 20 psig.

The process of the present invention is also applicable to, and can be integrated with, cyclic systems in which the regeneration of the absorbent solution is carried out in two columns (arranged in series or in parallel), of which the first (main column) operates at a higher pressure and by means of heat supplied from the outside, and the other (secondary column) at a lower pressure and substantially by means of heat recovered from the regenerated solution exited from the main column.

The absorption stage typically comprises at least one absorption column suitably equipped with means for producing intimate gas-liquid contact. For such purposes, packing materials are used such as Raschig TM rings, Berl TM saddles, Intalox TM saddles, Pall TM rings or other types of packing bodies exposing a large surface of liquid to the gas flowing through the packing. In place of packing, other means such as plates, e.g. sieve trays, may be employed for insuring intimate gas-liquid contact.

Likewise, the regeneration stage typically comprises at least one regeneration column also containing packing materials or plates to insure intimate contact between the scrubbing solution and stripping steam passing through this column.

In accordance with conventional cyclic acid gas removal techniques in their simplest form, scrubbing solution enters the absorber at or near the top of the column through one or more separate streams which may or may not be independently cooled and flows down through the column typically in a countercurrent direction with the feed gas to be purified. As a result of the scrubbing action within the column, the acidic gas components in the stream are absorbed into the liquid scrubbing solution. The purified feed gas stream is removed and passed to further processing. Wash trays and/or an entrainment separator may be employed to separate entrained or vaporized scrubbing solution from the purified feed gas process stream.

The resulting spent scrubbing solution laden with acidic gas components is removed at elevated pressure and temperature and regenerated in the regeneration column preferably at a lower pressure, by a process sequence involving heating, typically with steam, to desorb the acid gas components.

Regeneration can be conducted in one or more steps. In multiple stage regeneration, a portion of the spent scrubbing solution is subjected to at least one intermediate degree of regeneration (i.e. leaving a higher proportion of absorbed gases in solution) while another fraction of the spent scrubbing solution is subjected to additional steam stripping to produce a more thoroughly regenerated scrubbing solution. Such multiple stage systems are described below in conjunction with FIG. 2 and in FIG. 7 of U.S. Pat. No. 2,886,405.

Referring to the drawings, the following discussion illustrates various embodiments wherein a process condensate stripper-compressor scheme is integrated into conventional cyclic absorption regeneration systems.

Figure 1:
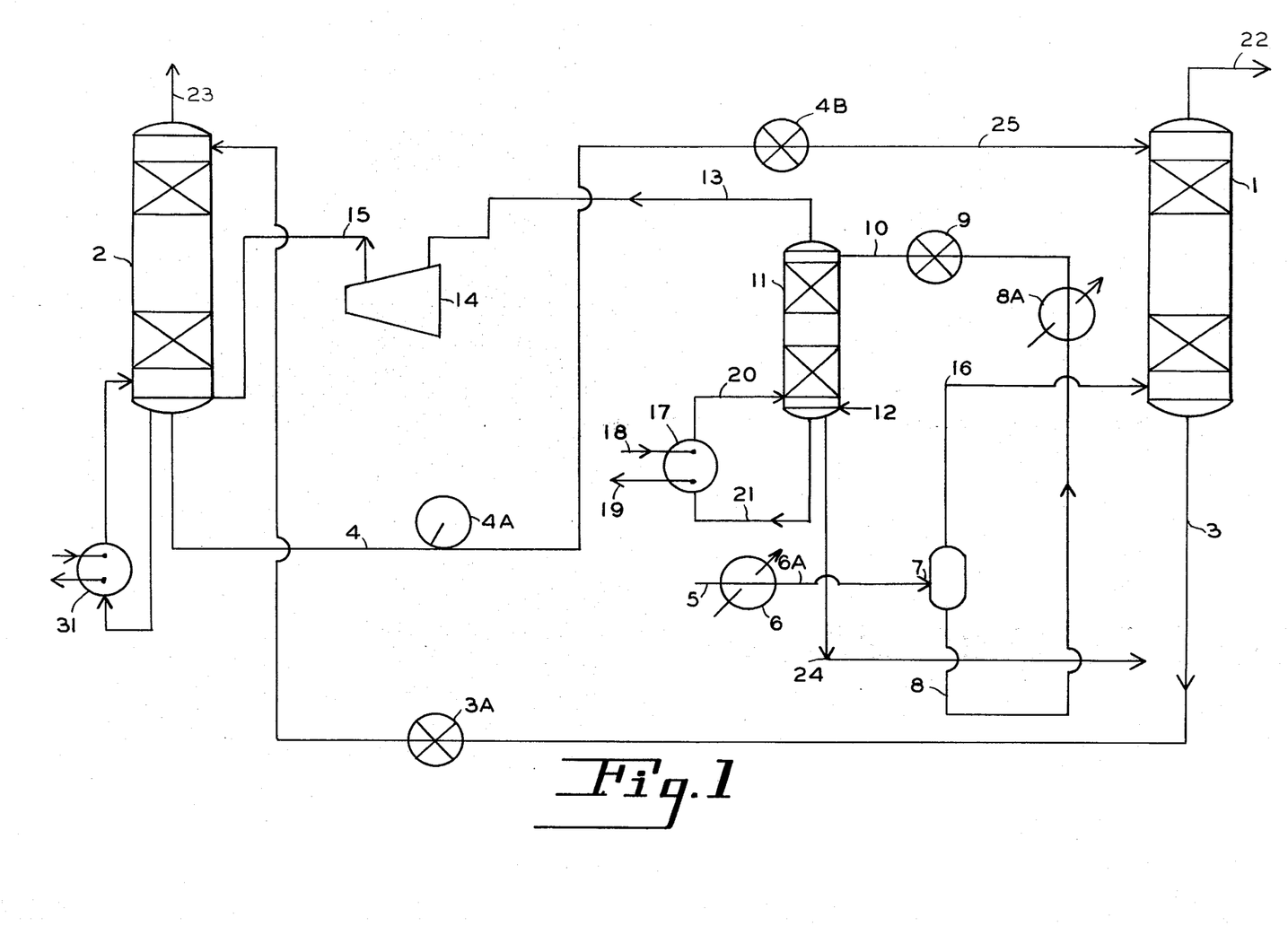
FIG. 1 is a diagrammatic flow sheet which illustrates a cyclic scrubbing process for the removal of acid gases having a process condensate stripper and compressor integrated therein in its broader aspects.

Referring to FIG. 1, hot (e.g., 440° to about 500° F.) process feed gas derived from a low temperature shift reactor is introduced into the system via line 5 at a pressure of from about 400 to about 500 psig and cooled by passing through at least one heat exchanger, collectively depicted by 6, to a temperature of about 220° to about 250° F. As a result of the cooling, a portion of the steam present therein condenses having $CO_2$ and the like impurities dissolved therein. This condensed steam-feed gas mixture is conducted by line 6A to knock-out pot 7 where the uncondensed gases are separated as overhead from the process condensate and passed at a temperature of from about 220° to about 250° F. through line 16 to absorption Column 1 operating at a pressure of from about 400 to about 500 psig.

The process condensate collected from the bottom of knock-out pot 7 is passed, at a temperature of from about 220° to about 250° F., and pressure of from about 400 to about 500 psig, through line 8, optionally through exchanger 8A where it is cooled when appropriate to a temperature sufficient to avoid or limit flashing upon entering line 10, and then through pressure letdown valve 9 where the pressure is reduced to between about 0 and about 6 psig in line 10. From line 10 the condensate enters process condensate stripper 11 which is substantially at the same pressure as in line 10, where it is heated by steam entering the stripper by line 12, said steam having a pressure of from about 1 to about 15 psig.

Alternatively the steam from line 12 can be replaced by a different heat source utilized in reboiler 17 which indirectly transfers heat from a fluid passing through lines 18 and 19. Preferably this reboiler constitutes one of the heat exchangers in the circuit between lines 5 and 6A and the heating fluid in lines 18 and 19 is the feed gas which is being cooled. In this embodiment the heating fluid enters the reboiler by line 18 at a temperature of from about 250° to about 300° F., and a pressure of from about 400 to about 500 psig, and exits by line 19 at a temperature of from about 220° to about 250° F., and pressure of from about 400 to about 500 psig. Circulating condensate in line 21 is thereby heated and boiled in the reboiler and returned to the stripper by line 20 at a temperature of from about 210° to about 230° F.

A vaporous mixture comprising excess steam generated at an amount of about 0.1–0.3 lbs steam/lb condensate, and stripped impurities are removed from the overhead of the stripper by line 13 which is connected to the suction side of compressor 14. The vaporous mixture is compressed to a pressure of from about 10 to about 15 psig and passed by line 15 to regeneration column 1.

Regenerated scrubbing solution is returned to absorber 1 by line 4, and pump 4A after passing through valve 4B where the flow of solution in line 25 is controlled. Spent scrubbing solution laden with acid gas impurities is passed to regeneration column 2 by line 3 after passing through pressure letdown valve 3A or alternatively a hydraulic turbine (not shown), and heated by reboiler 31.

Stripped process condensate is removed from stripper 11 by line 24 for further processing, e.g. for demineralization.

Impurities present in the condensate of line 10 comprise those illustrated hereinabove at similar concentrations while the concentration of impurities in the stripped process condensate of line 24 also typically varies as illustrated hereinabove.

Desorbed $CO_2$ and/or $H_2S$, associated steam and entrained liquid exit regeneration column 2 by line 23 and are dealt with by conventional techniques in the art. For example, this stream could be vented directly, or be cooled to condense steam in one or more stages. Before and/or after purified feed gas exits absorption column 1 by line 22, entrained liquid is removed, and the gas passed to the next stage of contemplated use for the purified process feed gas, e.g., for ammonia synthesis.

Figure 2:
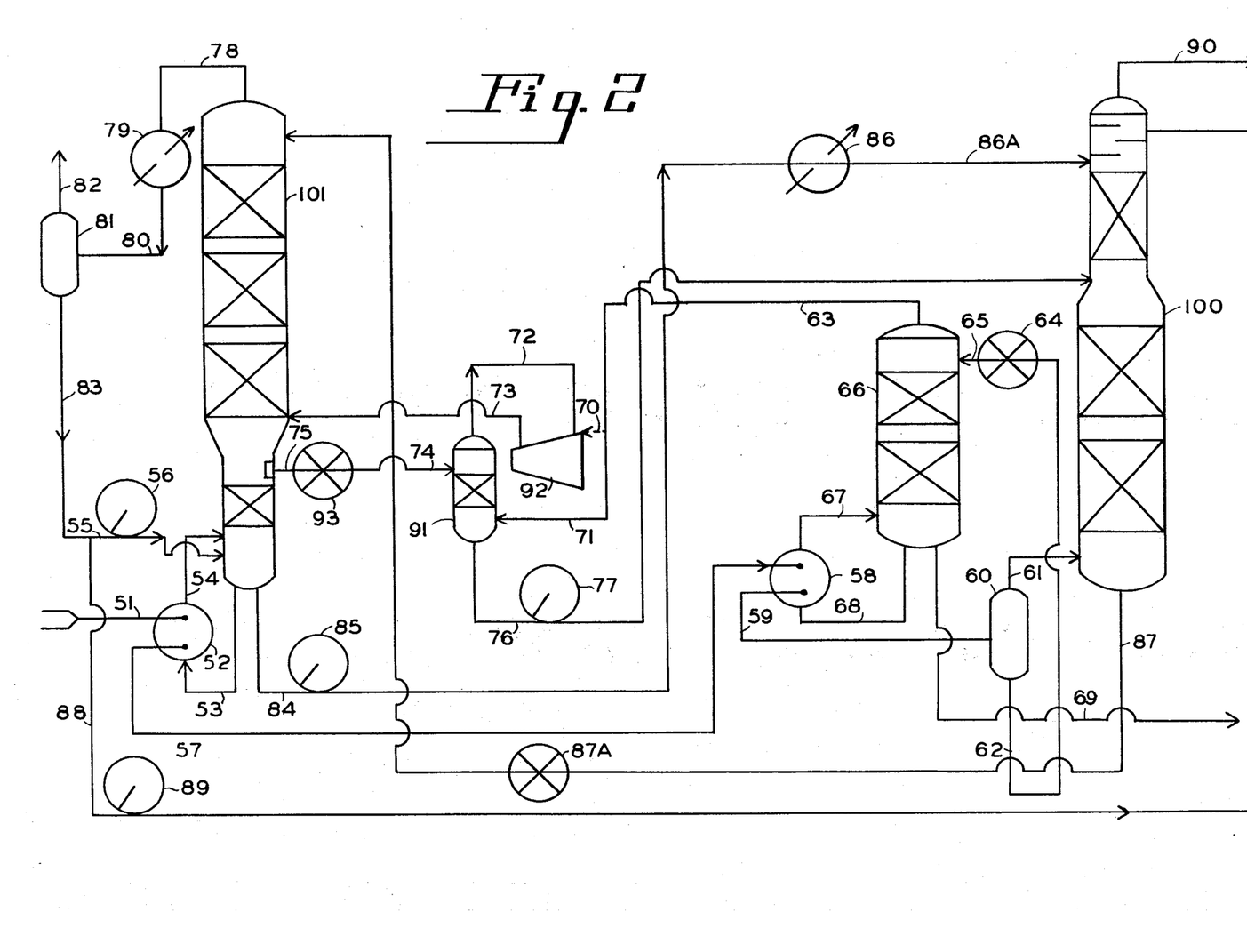
FIG. 2 is a diagrammatic flow sheet which illustrates more preferred embodiments of similar cyclic scrubbing processes.

FIG. 2 illustrates a more preferred embodiment of the present invention and the manner in which it is integrated into a cyclic absorption regeneration system. The feed gas constitutes low temperature shift effluent derived during the course of ammonia synthesis. This embodiment employs a two stage absorber 100 and a two-stage regenerator 101. The absorbent solution comprises two types, the first referred to herein as lean solution having about a 10–25% conversion of potassium carbonate to bicarbonate, and the second referred to herein as a semi-lean solution having about a 30–50% conversion of carbonate to bicarbonate. Conventional promoters are also employed in conjunction therewith.

Accordingly, referring to FIG. 2, feed gas leaving upstream higher level heat recovery at about 300°–350° F. is passed by line 51 to reboiler 52 through which is passed, in indirect heat exchange relationship, lean solution withdrawn from regenerator 101 by line 53 at a temperature of about 230°–270° F. The heat from the feed gas is transferred to the lean solution heating it to its boiling point. The steam liquid mixture thereby generated exits reboiler 52 by line 54 and is introduced into regenerator 101 to provide stripping steam at a pressure of about 10–20 psig.

The feed gas exits reboiler 52 by line 57 at a temperature of about 250°–300° F. and pressure of about 400–500 psig, and is passed to reboiler 58 where it is further cooled to about 220°–250° F. by transferring heat, in indirect heat exchange relationship, to process condensate withdrawn (at 210°–230° F. and about 0–6 psig) from condensate stripper 66 by line 68. The process condensate is thereby boiled. The resulting steam exits reboiler 58 and is introduced into condensate stripper 66 as condensate stripping steam by line 67.

The cooling of the feed gas in reboilers 52 and 58 causes a portion of the steam therein to condense and impurities to dissolve therein. The uncondensed feed gas and condensed water solution mixture in line 59, at a temperature of about 220°–250° F., is passed to knock out pot 60 where the unstripped condensate is collected and removed from the bottom thereof by line 62. The feed gas is then passed to absorption column 100 by line 61.

The unstripped condensate is then passed through pressure letdown valve 64 which reduces the pressure of the unstripped condensate in line 65 to about 0-6 psig as it enters condensate stripper 66. Condensate stripper 66 is equipped with appropriate gas-liquid contact means. The steam from line 67 generated by reboiler 58 strips the condensate of its impurities. The stripped condensate having an ammonia content of 1 to 20 ppm exits the stripper by line 69 and passes to the demineralization plant as make-up boiler feedwater.

Line 63, connected to the suction side of compressor 92, directly by dotted line 70 or preferably indirectly by line 71 through flash tank 91 and line 72, withdraws steam and stripped impurities as a vaporous mixture from the overhead of condensate stripper 66 at an amount of about 0.1 to 0.3 lbs steam/lb condensate and passes it to compressor 92 where it is compressed to a pressure of about 10-20 psig. The compressed steam is introduced into the semi-lean section of regeneration column 101 by line 73 and serves as stripping steam for the rich gas laden scrubbing solution.

When flask tank 91 is integrated into the circuit, semi-lean scrubbing solution at about 10-20 psig is withdrawn from regeneration column 101 by line 75, passed through pressure letdown valve 93 and line 74 (at about 0-6 psig) to flash tank 91 where a portion of the solution is converted to steam. The flashing of this solution is preferably promoted by the steam from line 71 exiting from condensate stripper 66. The semi-lean solution derived steam together with the condensate stripper derived vaporous mixture are both then fed to, and compressed in, compressor 92. While the use of steam from line 71 in this manner is preferred, it is not critical to the process of the present invention and condensate stripper steam can alternatively be fed to the compressor directly, solely by line 70, regardless of whether flash tank 91 is employed.

In either of the alternative embodiments in FIG. 2, the steam and impurities are compressed to a pressure of from about 10 to about 20 psig.

Absorption column 100 is a two-stage tower operating at a pressure of about 400-500 psig having a bulk $CO_2$ removal section at the bottom and a cleanup section above it. Feed gas in line 61 enters the bottom of column 100. Semi-lean scrubbing solution, driven by pump 77 as it leaves flash tank 91, enters the top of the bulk section from line 76 and flows in countercurrent direction to the feed gas. Lean scrubbing solution, withdrawn at a temperature of about 240°-270° F., and pressure of 10-20 psig, from the bottom of regeneration column 101 by line 84 is driven by pump 85 through indirect heat exchanger 86 where it is cooled and then introduced into the top of the cleanup section of absorption column 100 by line 86A. Purified feed gas is washed, exits the top of absorption column 100 by line 90, entrained liquid is optionally removed, and the feed gas is passed to the next stage of ammonia synthesis. Washwater is introduced into the wash section of absorption column through line 88 and pump 89.

Rich scrubbing solution laden with acid gases is withdrawn from the bottom of absorption column 100 by line 87, passes through pressure letdown valve 87A and/or a hydraulic turbine (not shown), and is introduced into the top of regeneration column 101. The rich scrubbing solution is stripped in two stages to yield lean and semi-lean solutions which are returned to absorption column 100 for further absorption. Thus, the upper section of regeneration column, referred to as the semi-lean section, partially strips the solution to produce semi-lean solution. A portion of the semi-lean solution passes into the lower section of regenerator 101, referred to herein as the lean section, where it is then further stripped to yield lean solution.

Desorbed steam and $CO_2$ exit the regeneration column by line 78, and are cooled by heat exchanger 79 to condense part of the steam. The condensed steam and gaseous $CO_2$ pass through line 80 and are separated in knock out pot 81. The condensed water is removed by line 83. A portion of this water is passed to line 55 and driven by pump 56 into the lean section of the regenerator as reflux water. Another portion of the condensed water in line 83 is passed by line 88 and pump 89 into the top of the absorption column 100 as absorber washwater. Any excess water is removed from the system, or extra water can be added as needed. The $CO_2$ from knock-out pot 81 exits the system by line 82, after which it may be further cooled if desired, and is used as desired, such as for urea production.

It should be noted that while the various sections of the regeneration and absorption columns are illustrated as being one unit, respectively, they can just as easily be split into separate towers.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. In a cyclic process for the removal of acid gases from a feed gas stream comprising a hot, steam-containing gas mixture by means of an aqueous alkaline scrubbing solution which is continuously recycled between an absorber in which said acid gases are absorbed by said scrubbing solution and a regenerator in which said acid gases are desorbed by steam-stripping, said hot steam containing gas mixture having at least a portion of the steam content therein condensed and separated from the gas mixture, prior to said gas mixture entering the absorber to form a process condensate having gaseous impurities dissolved therein, the improvement comprising:
   (a) subjecting said process condensate to a pressure lower than the pressure at which scrubbing solution regeneration takes place;
   (b) subsequently heating the process condensate resulting from, and at the pressure of, step (a) with at least one fluid having a temperature sufficient to boil said process condensate to strip said process condensate of at least a portion of the gaseous impurities dissolved therein and to yield a vaporous mixture comprising steam and said stripped gaseous impurities;
   (c) separating said vaporous mixture of step (b) from the stripped process condensate and compressing the vaporous mixture to a pressure at least equal to the pressure at which scrubbing solution regeneration takes place;
   (d) introducing said compressed vaporous mixture into the regenerator to assist in said steam stripping.

2. The process of claim 1 wherein the process condensate in step (b) is heated in an indirect heat exchanger with said fluid.

3. The process of claim 1 wherein at least a portion of the heat used to strip the process condensate in step (b) is provided by indirect heat exchange contact with the feed gas.

4. The process of claim 2 wherein:
  (a) the pressure to which the process condensate is subjected in step (a) is from about 1 to about 25 psi below the pressure at which scrubbing solution regeneration takes place; and
  (b) the fluid used to heat the process condensate in step (b) is the feed gas, which exits said indirect heat exchanger at a temperature of not greater than about 50° F. above the boiling point of the process condensate of step (a).

5. The process of claim 1 wherein the process condensate in step (b) is heated in direct heat exchange relationship with steam, said steam having a condensation temperature at its supply pressure of not greater than about 50° F. above the boiling point of the process condensate of step (a).

6. In a cyclic process for the removal of acid gases from a feed gas stream comprising a hot, steam-containing gas mixture by means of an aqueous alkaline scrubbing solution which is continuously recycled between an absorber in which said acid gases are absorbed by said scrubbing solution and a regenerator in which said acid gases are desorbed by steam-stripping, and in which said stripping steam is at least partially derived from said hot, steam-containing feed gas, the improvement which comprises:
  (a) cooling said feed gas prior to entering the absorber to a temperature sufficient to condense at least a portion of the steam content therein thereby forming a process condensate comprising said condensed steam and gaseous impurities dissolved therein;
  (b) separating the process condensate of step (a) from the feed gas;
  (c) subjecting said process condensate to a pressure lower than the pressure at which scrubbing solution regeneration takes place;
  (d) subsequently heating the process condensate resulting from, and at the pressure of, step (c) by bringing it in indirect heat exchange relationship with the feed gas prior to its entering the absorber, said feed gas being at a temperature sufficient to boil said process condensate, said heating being conducted in a manner sufficient to strip the process condensate of at least a portion of the gaseous impurities dissolved therein, and in a manner sufficient to yield from the process condensate a vaporous mixture of steam and said stripped gaseous impurities;
  (e) separating said vaporous mixture of step (d) from the stripped process condensate and compressing the vaporous mixture to a pressure at least equal to the pressure at which scrubbing solution regeneration takes place;
  (f) introducing said compressed vaporous mixture into the regenerator to assist in said steam stripping;
and wherein at least a portion of the heat content removed from the feed gas during the cooling of step (a) is used to boil scrubbing solution to produce steam utilized as stripping steam for regenerating said solution by:
  (i) passing said hot feed gas, prior to using the feed gas to heat the process condensate in step (d), in indirect heat exchange relationship with said scrubbing solution, said hot feed gas being at a temperature sufficient to boil said scrubbing solution, thereby heating said scrubbing solution to its boiling point and producing steam; and
  (ii) introducing said scrubbing solution derived steam into the regenerator.

7. The process according to claim 6 wherein:
  (a) the pressure to which the process condensate is subjected in step (c) is from about 1 to about 25 psi below the pressure in which the scrubbing solution regeneration takes place; and
  (b) the feed gas exits said indirect heat exchanger at a temperature of not greater than about 50° F. above the boiling point of the process condensate of step (c).

* * * * *